Feb. 10, 1953 C. B. LUBBERT 2,627,986
TRANSFERRING AND STACKING APPARATUS
Filed Sept. 1, 1949 2 SHEETS—SHEET 2
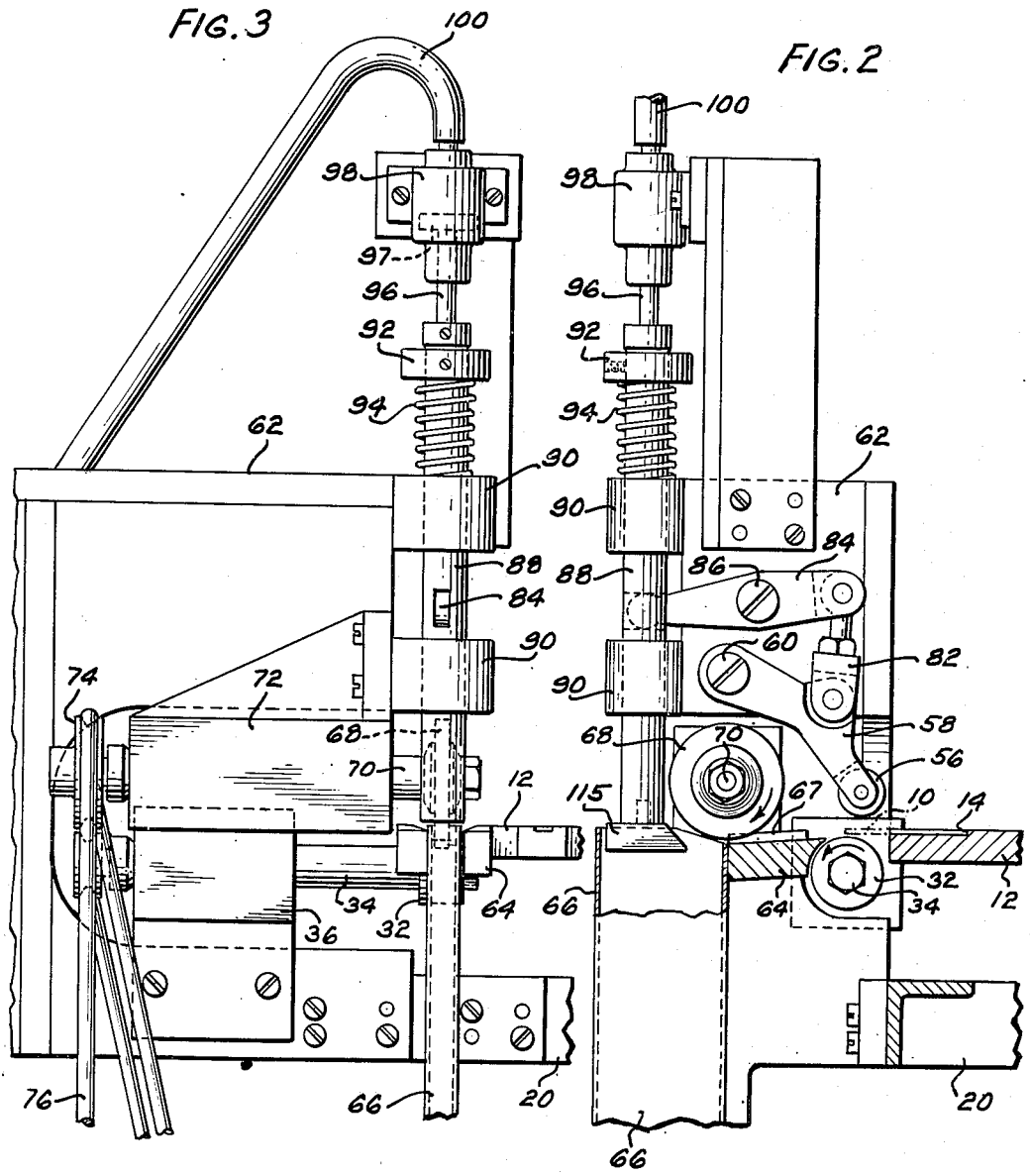
INVENTOR
C. B. LUBBERT
BY E. F. Kane
ATTORNEY Patented Feb. 10, 1953

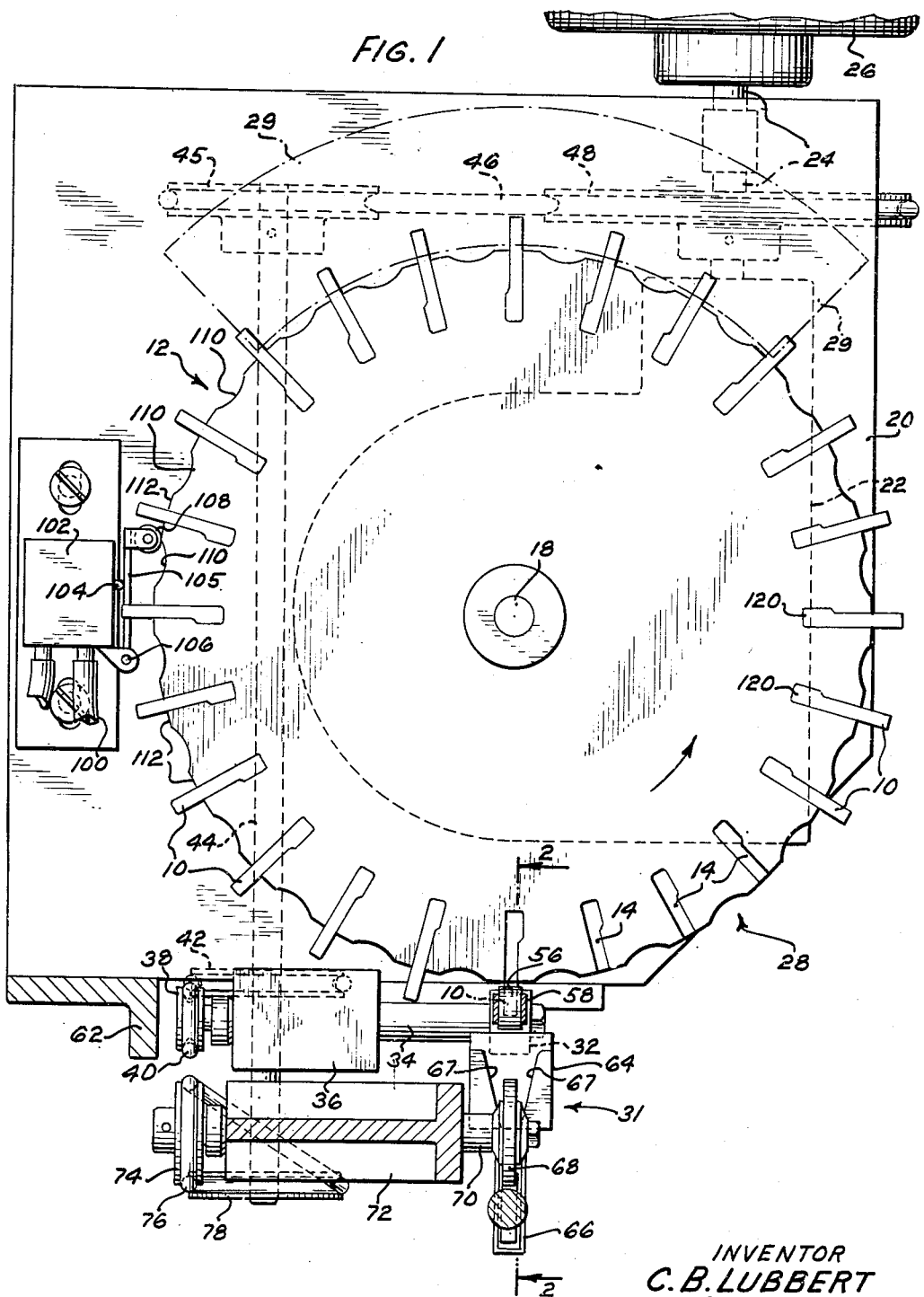

2,627,986

UNITED STATES PATENT OFFICE 2,627,986

TRANSFERRING AND STACKING APPARATUS

Carl B. Lubbert, Anneslie, Md., assignor to Western Electric Company, Incorporated, New York, N. Y., a corporation of New York Application September 1, 1949, Serial No. 113,532

17 Claims. (Cl. 214—6)

1

This invention relates to an article carrying, removing and stacking apparatus and more particularly to an apparatus for removing piece parts from a continuously rotating feed table and stacking the parts.

It is an object of the present invention to provide an improved device for removing articles from a moving carrier and orienting the articles.

In accordance with one embodiment of the invention, a continuously rotating feed table having spaced seats thereon for supporting piece parts in overhanging relation to the edge of the table guides the parts loaded thereon through a predetermined path to permit processing of the parts and moves the parts, at an unloading point, between a pair of rollers, one of which is a continuously rotating feed roller and the other of which is intermittently moved toward and away from the feed roller in timed relation to the rotation of the feed table to engage each successive part and move it into engagement with the feed roller and cause the part to be gripped between the rollers and removed radially from the feed table and advanced into engagement with a second continuously rotating feed wheel which, in turn, advances the part into a chute, which orients the parts.

Other objects and advantages of the invention will be more clearly understood by reference to the following detailed description and the accompanying drawings illustrating a preferred embodiment thereof in which Fig. 1 is a plan sectional view of the article removing and stacking apparatus;

Fig. 2 is a sectional-elevational view of a portion of the apparatus taken on the line 2—2 of Fig. 1; and Fig. 3 is an end view of a portion of the apparatus.

The present apparatus is designed to move articles or piece parts, such as flat spring contact members 10, in a predetermined path through an induction heating device where the springs are heat-treated and to remove the parts at an unloading point or station and to stack the parts. A continuously moving rotary feed table or carrier 12 is provided on its upper surface with a plurality of circumferentially spaced shallow cutouts or grooves 14 forming seats for receiving end portions of the springs 10 to support the springs thereon in spaced relation to each other and with the other end portions thereof projecting horizontally outwardly from the peripheral edge of the feed table in overhanging relation thereto. The feed table 12 is secured to one end of a shaft 18,

2 which is rotatably supported in a framework 20 and is connected to a gear drive enclosed in a housing 22 (Fig. 1) and is driven from a drive shaft 24 connected to a drive motor 26. The parts 10 applied to the feed wheel 12 at the loading station 28 are carried in a horizontal arcuate path through the induction heating device, indicated in dot and dash lines at 29 in Fig. 1, and are removed from the feed table at unloading station by unloading mechanism, generally indicated at 31.

The unloading mechanism comprises a continuously driven feed roller 32 disposed adjacent to the periphery of the feed table 12 and slightly beneath the path of travel of the springs 10. The roller 32 is secured to one end of the shaft 34, which is journalled in a bearing 36 mounted on the frame 20. At its other end, the shaft 34 has secured thereto a pulley 38, which is connected by a belt 40 to a pulley 42 on a countershaft 44. The shaft 44 is journalled in suitable bearings mounted on the frame 20 and has secured thereto a pulley 45, which is connected by a belt 46 to a drive pulley 48 mounted on the drive shaft 24. The feed roller 32 is rotated in a counter-clockwise direction, as indicated in Fig. 2, and each of the springs 10, as it arrives at the unloading station in vertical alignment with the roller 32, is moved downwardly into engagement therewith by a pressure roller 56 and is caused to be removed from the feed table 12 in a direction radial thereto. The roller 56 is rotatably supported at one end of a lever 58 fulcrumed at 60 to a supporting bracket 62 fixed to the framework 20 and is adapted to be oscillated about the fulcrum 60 toward and away from the roller 32 in timed relation with the rotation of the feed table 12 by mechanism later to be described.

The springs 10, as they are advanced by the feed roller 32, are supported on the upper surface of a guide block 64 secured to the frame 20 and which at one end is formed to fit in close proximity to the roller 32. A spring receiving and stacking tubular chute 66, having an open upper end, is mounted on the guide member 64 with its upper open end in substantial horizontal alignment with the upper surface of the member 64.

On its upper surface, the guide member 64 is provided with a pair of converging shoulders or side rails 67 forming a horizontally tapering guideway for directing the springs into the open end of the chute 66. Positioned above the guide member 64 and the chute 66 and in horizontally spaced relation to the pressure roller 56 is a continuously rotating feed roller 68. The feed roller 68 is secured to one end of a shaft 70 suitably journalled in a bearing 72 and has secured to its other end a pulley 74, which is connected by a belt 76 to a drive pulley 78 mounted on the countershaft 44. The continuously rotating feed wheel 68 serves to engage the upper surface of the springs 10 removed from the feed table 12 by the feed wheel 32 and the roller 56 and feed them into the chute 66 in which the springs may be stacked or through which they may be guided into trays or magazines (not shown) to receive them.

At a point intermediate its ends, the lever 58, which rotatably supports the roller 56, is connected by a link 82 to one end of a lever 84 fulcrumed intermediate its end at 86 and having its other end pivotally connected to the vertically reciprocable rod 88 by fitting into a transverse slot therein. The rod 88 is slidably mounted in guide bearings 90—90 on the bracket 62 and at its upper end has a collar 92 between which collar and the upper bearing 90 a helical compression spring 94 is positioned to stress the rod 88 for movement upwardly. The upper end of the rod 88 is connected to a piston rod 96 of a piston 97, which has a limited travel within a cylinder 98. The cylinder 98 is mounted in fixed position on the bracket 62 and is connected by a flexible pipe 100 to a control valve 102 and to a source of compressed air for actuating the piston 97 in a downward direction.

The air control valve 102 has a stem 104 extending therefrom into engagement with the intermediate portion of a valve actuating arm 105 pivotally connected at 106 to the valve and carrying a roller 108 at its opposite end. The roller 108 is urged outwardly to the right, as viewed in Fig. 1, by the stem 104 and is positioned to ride on the peripheral edge of the feed wheel 12, which is provided with a plurality of cam recesses or indentations 110, one of which is positioned between each pair of seats 14 on the feed wheel. The cam recesses 110 are shorter than the cam lobes 112 formed therebetween and serve, during the operation of the apparatus, to open the valve 102 for a relatively short period of time to cause the actuation of the piston 97 and the linkage and the pressure roller 56 connected thereto. Also actuated by the reciprocation of the rod 88 is a pusher member 115 secured to the lower end of the rod 88 and fitting into the upper open end of the chute 66. As the rod 88 is raised, the member 115 is raised with it to permit clearance for the movement of the springs 10 into the chute 66, and as the rod 88 is lowered, the member 115 serves to push the springs 10 down into the chute 66.

From the foregoing description, it will be seen that in the operation of the apparatus the parts 10 are placed in the seats 14 on the continuously rotating feed table 12 and are carried thereby through the induction heating device 29 to the unloading station where they are positioned between the feed and pressure rollers 32 and 56, respectively. The regular intermittent actuation of the valve 102 is synchronized with the movement of the table 12 so that, as the part 10 is moved into vertical alignment between the rollers 32 and 56, the piston 97 and the linkage operatively connected thereto are actuated to cause the roller 56 to be rapidly lowered, thus causing the engagement of the roller 56 with the projecting end of the spring 10 and the movement of the spring 10 into engagement with the rotating feed roller 36 to effect the rapid almost instantaneous removal of the spring radially from the feed table 12. The interval of time during which the roller 56 maintains the spring 10 in engagement with the feed roller 32 is relatively short, but the movement imparted to the spring by the feed roller 32 during this short interval is sufficient to advance it into engagement with the feed roller 68, which serves to further advance the spring into the chute 66, the pusher member 115 at this time being in its elevated position. The roller 56 is rapidly returned to its normal upper position, shown in Fig. 2, to provide clearance for the next succeeding part 10 on the feed table 12, and simultaneously therewith the pusher member 115 is moved down to push away any of the parts 10 that may for any reason be positioned in the upper end of the chute to make room for succeeding parts.

This apparatus is suited for handling piece parts having enlarged ends 120 (Fig. 1) which fit in conforming seats formed in the feed table 12. Piece parts of this shape are interlocked with the seat against horizontal movement and may not be removed from the feed table except by raising the enlarged end 120 out of engagement with the pocket formed by the seat 14. This raising of the enlarged end 120 of the part 10 is accomplished in the present mechanism by the downward movement of the pressure roller 56 into engagement with the outer end of the part 10, which action tilts the part intermediate its ends about the edge of the table 12, after which tilting action the part 10 is withdrawn very rapidly in a radial direction from the feed table 12. The upper surface of the guide member 64 slopes slightly to receive the part 10 in an inclined or tilted position, and as the part is advanced relative to the guide 64, the converging shoulders 65 guide it laterally under the feed roller 68 and into the upper end of the chute 66.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for removing and stacking articles comprising a continuously moving carrier having spaced seats on the upper surface thereof to support articles thereon in spaced relation to each other and with portions of the articles overhanging the carrier and to advance said articles through a predetermined path, continuously operating means located below, adjacent and in vertical alignment with a point in the path of movement of the articles on said carrier for moving articles pressed theregainst laterally from said carrier, an element mounted above said continuously operating means and the path of movement of said articles for movement toward and away from said continuously operating means for engaging and moving the overhanging portions of successive articles into frictional engagement with the continuously operating means to cause the article to be moved laterally from the carrier, and means operable in timed relation to the movement of said carrier for actuating said element.

2. In an apparatus for removing and stacking piece parts, a rotary feed table having spaced seats for supporting said piece parts with portions thereof projecting outwardly from said feed table in overhanging relation, means for rotating said table to advance said piece parts through a predetermined path of movement, a pair of rollers mounted on opposite sides of said path of movement of the overhanging portions of the piece parts supported by said feed table, means for moving one of said rollers toward and away from the other in timed relation to the movement of said rotary feed table to engage the projecting portion of said piece part and move it into engagement with said other roller and cause it to be gripped between said rollers, and means for continuously rotating one of said rollers to cause the part gripped between said rollers to be removed from said feed table.

3. In an apparatus for removing and stacking piece parts from a rotary feed table having spaced seats for supporting piece parts therein with portions thereof overhanging said feed table, the combination with said feed table of means for rotating said table to advance said parts through a predetermined path, a pair of rollers mounted in spaced relation to each other on opposite sides of the path of movement of the overhanging portions of said piece parts, actuating means for moving one of said rollers into and out of engagement with the other in timed relation to the rotation of said feed wheel whereby said roller is caused to engage the overhanging portion of said piece part and move it into engagement with said other roller and cause it to be gripped between said roller, and means for rotating said other roller to cause the piece part gripped between said rollers to be moved from said feed table.

4. An apparatus for removing and stacking piece parts comprising a rotary feed table having means for supporting parts thereon in spaced relation to each other and in overhanging relation to the edge of the table, a first feed roller mounted adjacent the edge of said rotary feed table and below the path of movement of the overhanging portions of said parts, a pressure roller mounted above said first feed roller and above the path of movement of the overhanging portions of said parts, a lever mounting said pressure roller for oscillating movement toward and away from said first feed roller to engage and move the overhanging portion of a part on said feed table into engagement with said first feed roller to cause the removal of said part radially from said feed table, a chute for receiving and stacking said parts, a guide member for supporting and guiding said parts for movement from the first feed roller to said chute, a continuously driven second feed roller mounted above said guide and engageable with the parts removed from said table by said first feed roller to advance said parts into said chute, a fluid actuator including a piston actuatable in one direction, spring means for moving said piston in the opposite direction, linkage interconnecting said piston and said lever, a valve for controlling the actuation of said fluid actuator, and cam means on said feed table for actuating said valve in timed relation to the rotation of said feed table to cause the oscillation of said lever to effect the removal of successive parts from said feed table.

5. An apparatus for feeding and discharging articles comprising a carrier having means for supporting articles thereon in regularly spaced relation to each other and in overhanging relation to the edge of said carrier, means for moving said carrier to advance said articles in a predetermined path, a continuously rotating feed roller disposed adjacent the edge of said carrier and below the path of movement of the overhanging portion of said articles for moving said articles laterally from said carrier, means including a member disposed above said first feed roller and above the path of movement of the overhanging portion of said articles movable toward and away from said first feed roller in timed relation to the movement of said carrier and operable to engage and press the overhanging ends of said articles into engagement with said feed roller to cause the movement of said article laterally from said carrier, and continuously movable means mounted in spaced relation to said feed roller and operable to engage said article as it is advanced by said first feed roll to further advance said article.

6. An article feeding device comprising a carrier having means for supporting articles thereon in regularly spaced relation to each other and in overhanging relation to the edge of said carrier, means for moving said carrier to advance said articles through a predetermined path, a continuously rotating first feed roller disposed adjacent the edge of said carrier and below the path of movement of the overhanging portion of said article for moving said articles laterally from said carrier, an idler roller disposed above said first feed roller and above the path of movement of the overhanging portions of said articles, actuating means operable for moving said idler roller toward and away from said first feed roller in timed relation to the movement of said carrier to engage and press the overhanging ends of succeeding articles into engagement with said first feed roller to cause said articles to be moved laterally from said carrier, stacking means, a second continuously rotating feed roller arranged relative to said first feed roller to engage the article as it is advanced by said first feed roller to further advance said article into said stacking means, and means for guiding said article from said first feed roller to said second feed roller and to hold said article in engagement with said second roller.

7. An apparatus for removing and stacking piece parts comprising a carrier having means for supporting piece parts thereon in regularly spaced relation to each other and in overhanging relation to the edge of said carrier, means for moving said carrier to advance said articles through a predetermined path, a pair of rollers disposed in spaced relation to each other on opposite sides of the path of travel of the overhanging portion of said parts, actuating means operable in timed relation to the movement of said carrier to effect relative movement of said rollers toward and away from each other to cause the gripping engagement of the overhanging portions of said article by said rollers, means for rotating one of said rollers to effect the removal of said article laterally from said carrier, stacking means including a chute, means mounted in the path of the lateral movement of said article to engage the articles advanced by said rollers to feed said articles into said chute.

8. An apparatus for removing and stacking piece parts comprising a carrier having means for supporting articles thereon in regularly spaced relation to each other and in overhanging relation to the edge of said carrier, means moving said carrier to advance said articles in a predetermined path, a continuously rotating first feed roller disposed adjacent the edge of said carrier and below the path of movement of the overhanging portion of said articles for moving said articles laterally from said carrier, a pressure member disposed above said feed roller and above the path of movement of the overhanging portions of said article mounted for movement toward and away from said feed roller to engage and move the overhanging portion of said article into engagement with said feed roller to cause the removal of said article laterally from said carrier, means for actuating said pressure member including a fluid actuator, a valve for controlling said fluid actuator, cam means on said carrier for actuating said valve, a continuously rotating second feed roller mounted in the path of lateral movement of said article for engaging and feeding the article removed from said carrier by said first feed roller, guide means for guiding said article from said first feed roller to said second feed roller and for holding said article in engagement with said second feed roller, and a chute for receiving said articles advanced by said second feed roller.

9. An apparatus for removing and stacking piece parts comprising a rotary table having spaced seats for receiving said piece parts with portions thereof extending outwardly from the edge of said table, means for rotating said table to advance said piece parts through a predetermined path, a feed roller mounted adjacent the edge of said feed table and below the path of travel of the projecting portions of said piece parts, an idler roller mounted above said feed roller and above the path of movement of the projecting portions of said piece parts, means for periodically actuating said idler roller in timed relation to the rotation of said table to move said idler roller toward and away from said driving roller to engage the projecting end of successive piece parts and move the parts toward said drive roller and into gripping relation between said rollers, a stationary guide member mounted adjacent said drive roller and forming a supporting surface for piece parts advanced between said roller, a second feed roller mounted above said guide member and engageable with said piece parts advanced by said first drive roller, means for rotating said feed rollers to advance said piece parts, and a stacking chute mounted in alignment with the movement of said piece parts as they are advanced by said feed rollers for receiving and stacking said piece parts.

10. An apparatus for removing articles from a continuously rotating feed table comprising in combination with said feed table means for supporting articles thereon in regularly spaced relation to each other and in overhanging relation to the edge of the table for advancing said articles through a predetermined path, a pair of rollers disposed in spaced relation to each other on opposite sides of the path of travel of the overhanging portion of said articles, means guiding one of said rollers for movement toward and away from the other to engage the overhanging portions of successive articles and to cause said article to be gripped between said rollers, means for continuously rotating one of said rollers to effect the movement of said article radially from said table, continuously operating means mounted in the path of lateral movement of said articles removed from said table by said pair of rollers for effecting the continued lateral movement of said articles, means for moving said one roller toward and away from said other roller including a fluid actuator having a piston fluid actuated in one direction, spring means for moving said piston in the opposite direction, a valve connected to said fluid actuator for controlling the admission of fluid thereto, and peripheral cam surfaces on said feed table for actuating said valve to cause the actuation of said fluid actuator and movement of said one roller toward and away from said other roller in timed relation to the rotation of said feed table.

11. An apparatus for removing articles from a moving carrier comprising the combination with said carrier of means on said carrier for supporting articles thereon in regularly spaced relation to each other and in overhanging relation to the edge of said carrier for advancing said articles through a predetermined path, a pair of rollers disposed on opposite sides of the path of travel of the overhanging portion of said parts and in spaced relation to each other and to said path of travel, means for continuously rotating one of said rollers, actuating means operable to effect movement of one of said rollers toward and away from said other roller to effect the gripping engagement of said article by said rollers for moving said article laterally from said carrier, continuously operating means mounted in the path of lateral movement of said articles removed from said carrier for engaging said articles and further moving said articles laterally with respect to the carrier, and actuating means including a fluid actuator, a valve for controlling said fluid actuator, and cam means on said carrier for actuating said valve.

12. An apparatus for removing and stacking articles comprising a continuously rotating feed table having means for supporting articles thereon in regularly spaced relation to each other and in overhanging relation to the edge of the table for advancing said articles through a predetermined path, a continuously operating roller mounted adjacent the edge of said rotary feed table and below the path of movement of the overhanging portion of said articles, a pressure roller mounted above said feed roller and above the path of movement of the overhanging portions of said articles, a lever mounting said pressure roller for oscillating movement toward and away from said feed roller to engage and move the overhanging portions of successive articles on said feed table into engagement with said feed roller to cause the removal of said articles radially from said table, a chute for receiving and stacking said parts, continuously operating feed means arranged relative to said first feed roller to receive the articles advanced thereby to feed said articles into said chute, a reciprocable plunger having a portion thereof movable within said chute for pushing said articles longitudinally of said chute, linkage interconnecting said plunger and said lever, a fluid actuator connected to said plunger for moving said plunger in one direction, spring means for moving said plunger in the opposite direction, a fluid control valve connected to said fluid actuator, and cam means on said feed table for actuating said valve to effect the intermittent operation of said plunger and said pressure roller in timed relation to the rotation of said feed table.

13. An apparatus for feeding and discharging articles comprising a carrier having means for supporting articles thereon in regularly spaced relation to each other and in overhanging relation to the edge of said carrier, means for moving said carrier to advance said articles in a predetermined path, a feed roller disposed adjacent the edge of said carrier and below the path of movement of the overhanging portion of said articles for removing said articles from said carrier, means for rotating said feed roller, a member disposed above said first feed roller and above the path of movement of the overhanging portion of said articles, and means for moving said member toward and away from said feed roller in timed relation to the movement of said carrier to engage and press the overhanging ends of said articles into engagement with said feed roller to cause the removal of said article from said carrier.

14. An apparatus for feeding and discharging articles comprising a carrier having means for supporting articles thereon in regularly spaced relation to each other and in overhanging relation to the edge of said carrier, means for moving said carrier to advance said articles in a predetermined path, a feed roller disposed adjacent the edge of said carrier and below the path of movement of the overhanging portion of said articles for moving said articles from said carrier, means for rotating said feed roller, an element disposed above said feed roller and above the path of movement of the overhanging portion of said articles movable toward and away from said feed roller in timed relation to the movement of said carrier and operable to engage and press the overhanging ends of said articles into engagement with said feed roller to cause the removal of said article from said carrier, a chute for receiving the articles removed from said carrier in superposed relation, a plunger reciprocable in timed relation to the movement of said carrier to push successive articles into said chute, and means for actuating said element and said plunger in timed relation to each other and to the movement of said carrier.

15. In an apparatus having a continuously movable carrier provided with seats on the upper surface thereof for supporting articles thereon with portions of the articles overhanging the carrier to advance the articles through a predetermined path, the combination therewith of a continuously operating means disposed on one side of said path of travel adjacent to and in vertical alignment with a point in said path of movement of said article for engaging the overhanging portions of the articles pressed thereagainst to move said articles from said carrier, an element mounted on the other side of said path of movement of said articles in vertical alignment with said continuously operating means for engaging and moving the overhanging portions of successive articles into engagement with the continuously operating means to cause the article to be moved from the carrier, and means operable in timed relation to the movement of said carrier for actuating said element.

16. In an apparatus having a movable carrier for supporting articles thereon in overhanging relation to advance said articles through a predetermined path of travel, the combination therewith of a pair of opposed members disposed on opposite sides of said path of travel of said articles, means for moving one of said members toward and away from said other member in timed relation to the movement of said carrier for engaging the overhanging portions of successive articles on said carrier and moving said articles into engagement with said other member, and means for actuating one of said members to remove said articles from said carrier.

17. In an apparatus of the type described the combination of a continuously movable carrier for supporting articles thereon in overhanging relation to advance said articles through a predetermined path of travel, a pair of opposed members disposed on opposite sides of said path of travel of said articles, means for moving one of said members toward and away from said other member in timed relation to the movement of said carrier for engaging the overhanging portions of successive articles on said carrier and moving said articles into engagement with said other member, and means for continuously actuating one of said members to remove said articles from said carrier.

CARL B. LUBBERT.

REFERENCES CITED

The following references are of record in the file of this patent:

UNITED STATES PATENTS

| Number | Name | Date |
| --- | --- | --- |
| 565,146 | Smyth | Aug. 4, 1896 |
| 609,472 | Smyser | Aug. 23, 1898 |
| 1,335,221 | Christensen | Mar. 30, 1920 |
| 1,960,002 | Eppensteiner et al. | May 22, 1934 |
| 2,374,668 | Davidson | May 1, 1945 |
| 2,443,281 | Terry | June 15, 1948 |